Oct. 14, 1958
M. R. GRISWOLD
2,855,696
MAGNETIC COMPASSES
Filed April 15, 1957
FIG. 1
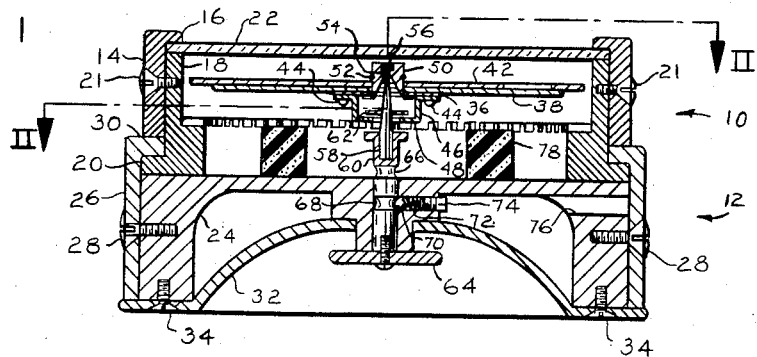
FIG. 2
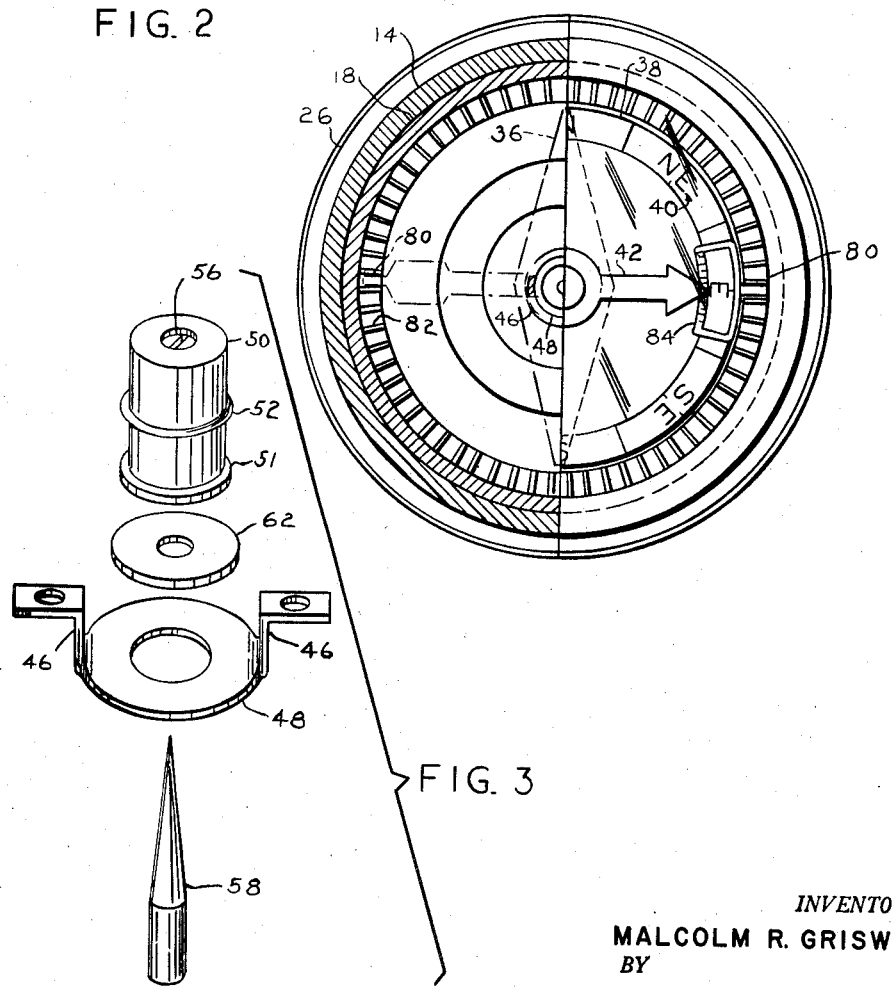
FIG. 3
INVENTOR.
MALCOLM R. GRISWOLD
BY
Chapin & Neal
Attorneys

United States Patent Office 2,855,696
Patented Oct. 14, 1958

2,855,696

MAGNETIC COMPASSES

Malcolm R. Griswold, Granby, Mass.

Application April 15, 1957, Serial No. 652,858

7 Claims. (Cl. 33—224)

The present invention relates to magnetic compasses and more particularly to improvements in compasses which automatically indicate a desired heading or course.

Campers and sailors are frequently presented with the problem of following a given heading for a considerable distance without the aid of landmarks. Many times they are unable to take prolonged compass readings to establish the correct bearing because of darkness or roughness of the sea, for example. In order that a desired heading may be readily ascertained, it has, in the past, been proposed to provide a compass having a pointer which may be adjusted to establish a heading in any desired direction.

Such prior devices have been found wanting because of complexity of adjustment and manufacture. Some of these prior devices have been further complicated by the manner in which magnet declination is compensated for.

The primary object of my invention is to provide a simplified compass construction having a course indicating pointer which may be readily and easily adjusted to establish a heading in any desired direction.

Another object of the invention is to provide a compass of the type described which is not only simple in construction but possesses great ruggedness even when made on a small scale as for carrying in the pocket of a camper or hiker.

Yet another object of the invention is to provide a magnetic compass of the type described which may be readily compensated for magnetic declination in a simple manner.

The above and other related objects of the invention including its various novel features will be readily apparent from a reading of the following description of the disclosure in the accompanying drawing and the particular novelty thereof pointed out in the claims.

In the drawing:

Fig. 1 is an elevation in cross section of my improved compass;

Fig. 2 is a section taken on line II—II in Fig. 1; and

Fig. 3 is an exploded angular view, on an enlarged scale, of certain parts of the compass bearing mounting.

The compass seen in the drawings comprises an upper case portion 10 which is rotatable with respect to a lower case portion 12 for reasons which shall further appear. The upper case portion comprises a cylindrical shell 14 having an inwardly extending flange 16 and a second cylindrical shell 18 having an outwardly extending flange 20 at its lower end. The shells 14 and 18 are secured together by screws 21. A transparent disc 22 of plastic or glass is captured between the flange 16 and the upper end of the shell 18 to seal off the upper end or face of the composite compass case.

The lower case portion 12 comprises a base 24 to which is secured a cylindrical shell 26 by screws 28. The shell 26 has an inwardly extending flange 30, the flange 20 being captured between the flange 30 and the upper surface of the base 24 to provide for rotative movement between the upper case portion 10 and lower case portion 12. It will be appreciated that the same rotative movement may be facilitated or provided by the manner in which the flange 30 is captured between the flange 20 and the lower end of the outer shell 14. The bottom of the base 24 may be provided with a cover 32 secured thereto by flat headed screws 34.

A magnetic indicating assembly is mounted within the upper case portion 10 and comprises a magnetic needle 36, a disc or card 38 on which are indicia 40 indicating the points of the compass and a bearing or direction indicator 42. The needle 36 and indicia bearing disc 38 are secured together by screws 44 which pass through upstanding legs 46 of a collar 48. The north indicating indicia on the disc 38 is thus aligned with the north seeking pole of the magnetic needle 36. The indicator 42 and the assembled disc 38 and needle 36 are snugly held on a hub 50 and against a flange 51 (Fig. 3) by a snap ring 52. For greater compass accuracy, a jeweled mounting 54 may be secured in the upper end of hub 50 by screw 56. The mounting 54 rides on the upper end of a needle bearing 58 secured in a socket formed in the upper end of a shaft 60. Also mounted on the needle bearing 58 is a washer 62 which is preferably soldered thereon.

The shaft 60 is slidably mounted in the base 24 and is provided with a knob 64 at its lower end which may be gripped to axially shift the shaft 60. Detent means releasably maintain the shaft 60 in selected axial positions and comprise grooves 66, 68 formed in said shaft and a ball 70. The ball 70 is urged toward the shaft 60 by a spring 72 which is held in place by a screw 74. A hole 76 in the base 24 is provided to facilitate forming of the bore which receives the ball 70, spring 72 and screw 74 as well as tightening of the latter.

The compass is shown in Figs. 1 and 2 as it would be used to follow an easterly heading. The hub 50 is freely rotatable on the needle bearing 58 so that the magnetic needle 36 will align itself with the north magnetic pole and the direction indicator 42 is set to and will indicate at a quick glance the direction of east (assuming zero magnetic declination).

When it is desired to establish some other heading, the knob 64 is gripped to shift or lower the shaft 60 sufficiently so that it will be maintained in such shifted position by the ball 70 entering the groove 66. It will be noted that the recessed form of the base 24 and bottom cover 32 permit the shaft 60 to be so shifted without it or the knob 64 protruding therebeyond. In this manner the shaft and bearing mounting are protected from injury.

When the shaft is shifted the washer 62 engages the collar 48 to draw the needle 36 and disc 38 firmly against a ring 78 of sponge rubber or other frictional material to lock said needle and disc in fixed relation with respect to the base 24 and thus the lower case portion 12. At the same time fingers 80, extending from either end of the direction indicator 42, enter appropriate slots 82 formed in the inner surface of the cylindrical shell 18. The directional indicator 42 is thus locked with respect to the upper case portion 10. With this arrangement the two case portions 10 and 12 may be relatively rotated to bring the indicator 42 to any desired heading with the aid of the indicia 40.

Other indicia are provided on an accurate segment 84 integral with and adjacent the pointer end of the indicator 42. These indicia, in the form of degree marks, extend in both directions so that plus or minus magnetic declinations may be compensated for. That is if a true easterly heading is desired the correct indicium on the segment 84, for a given declination, is set against the east indicium on the disc 38. The direction indicator 42 is thus set to show a true earterly heading. Thereafter the shaft 60 is raised and the compass is ready for use.

Having thus described my invention what I claim as novel and desire to secure by Letters Patent of the United States is:

1. A magnetic compass comprising an upper case portion, a lower case portion, said portions being relatively rotatable, a magnetic needle, a disc having indicia indicating the points of a compass, a direction indicator above said disc, said needle, disc and indicator being rotatable as a unit to establish a given course heading as indicated by the direction indicator, and means including a slidable shaft disposed axially of the center of rotation of the needle for locking the direction indicator with respect to the upper case portion and locking the needle and disc with respect to the lower case portion whereby the two case portions may be relatively rotated to vary the heading indicated by the direction indicator, said shaft extending through the bottom wall of the lower case portion for manual manipulation.

2. A magnetic compass comprising an upper case portion, a lower case portion, said portions being relatively rotatable, a magnetic needle, a disc secured to the upper face of said needle and having indicia indicating the points of a compass, a direction indicator above said disc, said indicator having fingers extending beyond the edges of said disc, a hub on which the needle, disc and indicator are mounted, said indicator being relatively rotatable with respect to said disc about said hub, a needle bearing on which the hub is rotatably mounted, a shaft slidably mounted on the base and having the needle bearing extending from its upper end, a collar secured to and spaced from the lower surface of said disc and surrounding said needle bearing, a washer fixed to said needle bearing intermediate the disc and the collar, a pad of friction material on said lower case portion beneath said disc and friction means extending from the upper case portion beneath the indicator fingers whereby the shaft may be slid to a lower position and through the washer and bracket bringing the indicator fingers into locking engagement with the friction means extending from the upper case portion and the disc into locking engagement with the pad of friction material on the lower case portion so that the upper and lower case portions may be relatively rotated to vary the heading indicated by the direction indicator.

3. A magnetic compass as set forth in claim 2 wherein the upper and lower case portions have interengaging flanges to provide for relative rotation therebetween.

4. A magnetic compass as set forth in claim 2 wherein detent means are provided to releasably maintain the shaft in its upper and lower positions.

5. A magnetic compass as set forth in claim 2 wherein the pad of friction material is a centrally disposed ring of foam rubber and the friction means extending from the upper case portion comprise a series of radially disposed recesses extending around the inner surface of said upper case portion.

6. A magnetic compass as set forth in claim 2 wherein the direction indicator is provided with an arcuate segment having indicia which may be matched against the indicia on said disc to compensate for magnetic declination so that the direction indicator will indicate a true heading.

7. A magnetic compass comprising a case, a magnetic needle, a disc having indicia indicating the points of a compass, a direction indicator above said disc, said needle, disc and indicator being rotatable as a unit to establish a given course heading, a plunger centrally disposed of the case slidable therein and extending below the bottom wall thereof, means for locking the direction indicator with respect to the case, a rotatable friction member, and means for bringing said needle and disc, as a unit, into engagement with said rotatable friction member whereby said needle and disc may be rotated with respect to said indicator, said last named means and said locking means being operable in response to movement of said plunger.

References Cited in the file of this patent

UNITED STATES PATENTS 2,108,263    L'abee-Lund _____ Feb. 15, 1938

FOREIGN PATENTS 431,275    France _____ Sept. 7, 1911